United States Patent [19]
Morgan et al.

[11] Patent Number: 5,340,511
[45] Date of Patent: Aug. 23, 1994

[54] PRODUCTION OF CARBON FIBRE

[75] Inventors: David L. Morgan; Vladimir Cukan; Klaus Frielingsdorf, all of Transvaal, South Africa

[73] Assignee: Enerkom (Proprietary Limited, Sandton, South Africa

[21] Appl. No.: 106,639

[22] Filed: Aug. 16, 1993

[30] Foreign Application Priority Data

Aug. 17, 1992 [ZA] South Africa ............ 92/6177

[51] Int. Cl.$^5$ .............................. D01F 9/12
[52] U.S. Cl. .................... 264/29.2; 264/29.6; 264/169; 264/211; 264/211.11; 264/211.16; 264/DIG. 19; 423/447.4; 423/447.7
[58] Field of Search ............ 264/29.2, 29.6, 169, 264/184, 205, 211, 211.11, 211.14, 211.16, DIG. 19; 423/447.1, 447.4, 447.7

[56] References Cited

U.S. PATENT DOCUMENTS

| | | | |
|---|---|---|---|
| 3,461,082 | 8/1969 | Otani | 502/432 |
| 3,723,609 | 3/1973 | Mansmann et al. | 423/447.1 |
| 3,852,428 | 12/1974 | Powell et al. | 423/447.6 |
| 4,250,131 | 2/1981 | Sobel et al. | 264/56 |
| 5,120,430 | 6/1992 | Morgan | 208/428 |

OTHER PUBLICATIONS

Proceedings of the Fourth London International Carbon and Graphite Conference, Sep. 1974, M. A. A. Jorro, et al., "Carbon Fibre From Coal", pp. 287-303.

Primary Examiner—Leo B. Tentoni
Attorney, Agent, or Firm—Oblon, Spivak, McClelland, Maier & Neustadt

[57] ABSTRACT

A method of producing carbon fiber includes the steps of providing a solution of a coal-derived material in a solvent, typically dimethylformamide, adding polyethylene oxide having a molecular weight of at least $3 \times 10^6$ daltons to the solution to provide a spinning solution, spinning the spinning solution into a fiber and causing the fiber to gel, typically by contacting it with a gelling solvent. The coal-derived material will have a composition, free of solvent, of 70 to 91 percent by mass of carbon, 2 to 6 percent by mass of hydrogen and 3 to 20 percent by mass of oxygen.

23 Claims, 1 Drawing Sheet

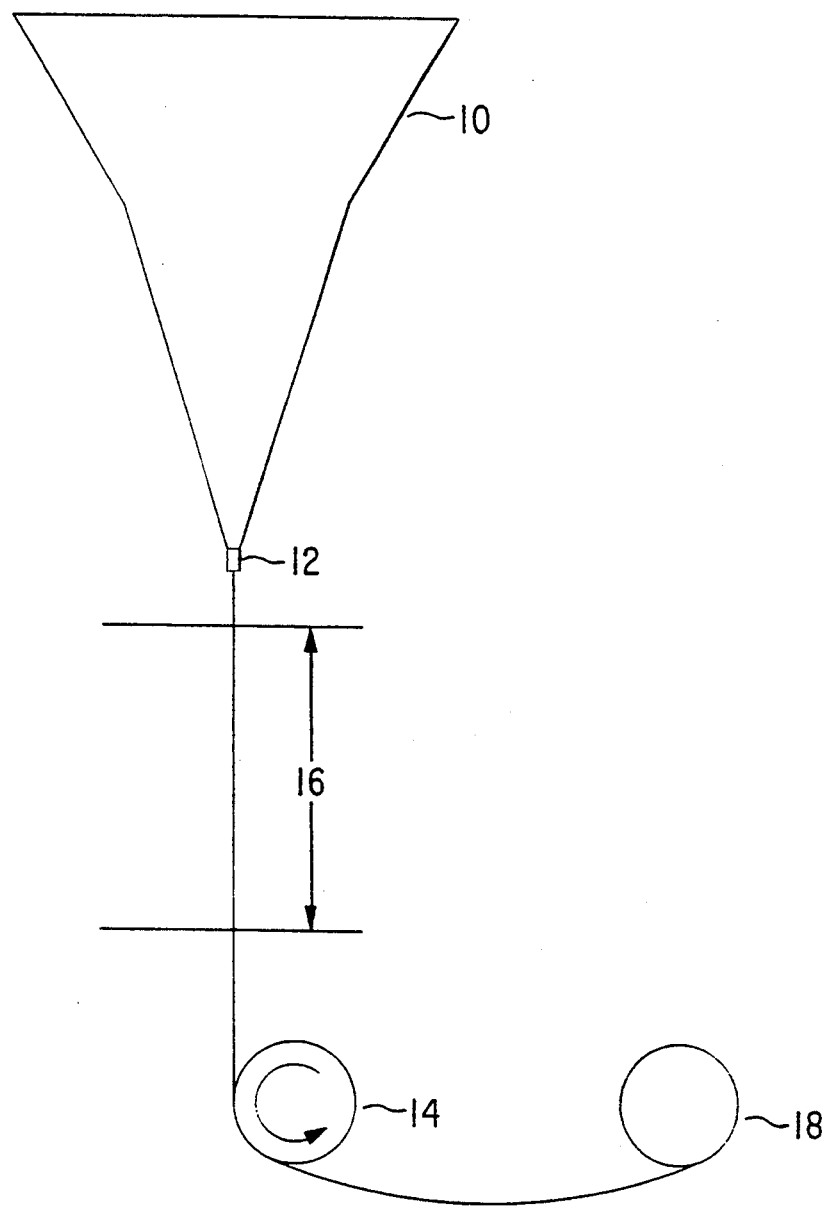

PRODUCTION OF CARBON FIBRE

BACKGROUND OF THE INVENTION

This invention relates to the production of carbon fiber.

Carbon fibers may be produced from a variety of feedstocks. For example, rayon, polyacrylonitrile and isotropic and liquid crystalline pitches may be spun into fiber form and then carbonized at a temperature of about 800° to 1000° C. to produce a carbon fiber. The carbon fiber may thereafter be heat treated at a temperature of 2000° to 3000° C. to graphitize the fiber. This has the effect of increasing the fiber modulus. Production of carbon fibers from rayon and polyacrylonitrile has the disadvantage that the feedstock material is relatively expensive and low carbon conversion to fiber is achieved. While the use of isotropic pitch involves a less expensive feedstock, melt-spinning is necessary and carbon conversion is relatively low. Preparation of liquid crystalline pitch is expensive and melt-spinning is again necessary.

U.S. Pat. No. 3,461,082 describes a method of producing carbon fiber from lignin using melt-spinning, dry-spinning or wet-spinning processes. Conversion of the carbon in the lignin to carbon fiber is relatively low.

U.S. Pat. No. 3,723,609 describes a method of producing carbon fibers from various raw materials such as lignin, together with various film-forming polymers. In one example, an ammonium lignin sulphonate solution is mixed with an aqueous polyethylene oxide solution. The solution is homogenised with the introduction of ammonia gas up to a pH of 10. The solution is filtered and then spun to produce fibers which are taken up on a rotating drum. The fibers are dried and then carbonized to produce flexible carbon fibers. The use of lignin leads to low carbon conversion to fiber.

M. A. A. Jorro and W. R. Ladner, Carbon Fiber from Coal, Proceedings of the Fourth London International Carbon and Graphite Conference, September 1974, pages 287 to 303, describes the production of carbon fibers from a coal extract. The extract is produced by digesting the coal at elevated temperature and pressure with a high boiling aromatic solvent. The resulting mixture, in which the coal has been chemically modified, is filtered to remove the mineral matter and undissolved coal and then the bulk of the solvent is removed by distillation under reduced pressure. Some of the solvent is retained in the extract to make it suitable for spinning. The production of the carbonized fiber from the coal extract involves extrusion and drawing of the molten extract to filaments, heating the filaments in an oxidizing atmosphere at an increasing temperature up to 250° C. to render them infusible and heating the filaments in an inert atmosphere up to a temperature of 1000° C. to carbonize them. The process described is a melt-spinning process.

SUMMARY OF THE INVENTION

A method of producing carbon fiber includes the steps of providing a solution of a coal-derived material in a solvent, the coal-derived material having a composition, free of solvent, of 70 to 91 percent by mass of carbon, 2 to 6 percent by mass of hydrogen, and 3 to 20 percent by mass of oxygen, adding polyethylene oxide having a molecular weight of at least $3 \times 10^6$ daltons to the solution to provide a spinning solution, spinning the spinning solution into a fiber and causing the fiber to gel.

DESCRIPTION OF THE DRAWING

The drawing illustrates diagrammatically an example of producing carbon fibers according to the invention.

DESCRIPTION OF EMBODIMENTS

The method of the invention is a fiber-spinning method carried out under mild conditions and achieving a high yield of fiber from a relatively inexpensive source or feed material. In particular, the method can achieve 70 to 80 percent conversion of the carbon in the coal-derived material to fiber.

The starting material is in the form of a solution containing a coal-derived material. This solution may be produced by the solubilization method described in U.S. Pat. No. 5,120,430. The method comprises solubilizing organic material in a coal by contacting the coal with a medium comprising an organic solvent and a strong base or a phenoxide reactively associated with the organic solvent. The medium may further contain a phase transfer catalyst such as a crown ether. The solvent is a dipolar aprotic solvent such as a dimethylformamide. The base preferably has a pKa value of its conjugate acid in the range 14 to 30. An example of such a base is a metal hydroxide such as sodium or potassium hydroxide.

The starting material may also be produced by the method disclosed in South African Patent No. 91/8774. This method involves treating coal with a base or a phenoxide followed by contacting the treated coal with an organic solvent. The base is typically a strong base such as one having a pKa value of its conjugate acid in the range 14 to 30. The solvent may be pyridine or a dipolar aprotic solvent.

The solvent for the coal-derived material is preferably a dipolar aprotic solvent. Examples of suitable dipolar aprotic solvents in which the coal-derived material is soluble are dimethylformamide, dimethylacetamide, tetramethylurea, dimethyltetrahydropyrimidinone and dimethylimidazolidinone. The preferred dipolar aprotic solvent is dimethylformamide.

The viscosity of the solution of coal-derived material is preferably sufficiently low to allow it to be filtered to remove particles down to micron and sub-micron dimensions. The removal of undissolved particles is desirable because the presence of such particles weakens the carbon fibers. By way of example, the viscosity of the solution will typically be 2 to 20 cP, at 30° C.

Generally, the concentration of the coal-derived material will be less than 25 percent by mass, typically 4 to 12 percent by mass.

The polyethylene oxide, also known as polyethylene glycol, acts as a film-forming polymer. It is critical that the polyethylene oxide has a molecular weight of at least $3 \times 10^6$ daltons, and preferably at least $4 \times 10^6$ daltons. It has been found that polyethylene oxides having lower molecular weights do not allow for fiber (filament) formation to take place. Further, other known film-forming polymers such as high molecular weight PVC, polyvinyl alcohol and epoxy resins do not allow for fiber (filament) formation to take place.

The polyethylene oxide may be added directly to the coal-derived material solution and allowed to dissolve therein. Care should be exercised to ensure that there is no degradation of the polymer and that the spinning solution is homogenous.

The polyethylene oxide is preferably added as a solution to the coal-derived material solution. To achieve this the polyethylene oxide may be dissolved in a solvent which is compatible with the solvent of the organic material solution. This means that it is miscible with the solvent of the coal-derived material solution and will be one in which the coal-derived material is soluble. Preferably, the solvent is also a dipolar, aprotic solvent of the type described above and the same as that used for the coal-derived material solution.

The mixing of the polyethylene oxide solution and the coal-derived material solution should be gentle to avoid degradation of the polyethylene oxide polymer. The mixing will generally take place at a temperature below 60° C. and typically at a temperature in the range 40° to 55° C. This avoids premature gelling of the solution and polymer degradation.

The spinning solution mixture is spun into fiber or filament form. The fiber or filament is preferably drawn so that it is under tension. The solvent in the fiber may be driven off by evaporation which has the effect of allowing the fiber to gel. The green state fiber may be carbonized by heating to a temperature of 400° to 1100° C., preferably 800° to 1000° C., to yield a carbon fiber. Such carbon fibers will be weak and suitable, for example, to make activated carbon fibers.

The fiber may also be caused to gel by bringing it into contact with a gaseous gelling agent and thereafter the solvent in the gelled fiber may be driven off by evaporation. An example of a gaseous gelling agent is a gaseous acid such as hydrochloric acid.

The spinning solution may be spun into a fiber or filament which is then brought into contact with a solvent in which the coal-derived material is insoluble. This produces conditions which allow the fiber to gel. The gelling solvent should be one in which the dipolar, aprotic solvent is soluble. Examples of gelling solvents are alcohols and acetone. The green state fiber may thereafter be carbonized at a temperature of 400° to 1100° C. to produce a carbon fiber. Such carbon fibers will have greater strength than those which are gelled by evaporation of the solvent.

The invention will be further described with reference to the accompanying drawing. A solution of a coal-derived material was prepared in a dipolar, aprotic solvent. Various medium volatile coking coals may be used resulting in organic carbon extractions as set out in Table 1 below:

TABLE 1

| Coals used | A | B | C |
|---|---|---|---|
| DAF analysis | | | |
| C % | 86,8 | 88,5 | 88,2 |
| H % | 5,2 | 5,2 | 5,0 |
| N % | 1,8 | 2,1 | 2,1 |
| O % | 5,4 | 3,4 | 3,6 |
| % Organic carbon extracted | 79 | 90 | 80 |

DAF = Dry Ash-Free basis.

Some solid material remains after the coal dissolution. This solid material will include undissolved coal and mineral particles. The solid material, preferably down to micron and sub-micron dimensions is removed. This may readily be achieved if the solution has a filterable viscosity. The removal may be achieved by centrifugation followed by filtration of sub-micron and larger particles.

It is preferred that the solubilization of the coal and removal of solid material be carried out in an inert atmosphere such as nitrogen, hydrogen or an inert gas to minimize oxidation of the organic material in the solution.

A solution is made of polyethylene oxide in a solvent which is compatible with the solvent of the coal-derived material solution. The concentration of the polyethylene oxide in the solution will generally be less than 5 percent by mass, and typically in the range 0.4 to 2 percent by mass. The polyethylene oxide has a molecular weight of at least $3 \times 10^6$ daltons.

The polyethylene oxide solution and the organic material solution are mixed to produce a spinning solution. Mixing is preferably done in an inert atmosphere and under gentle conditions to avoid degradation of the polyethylene oxide polymer. The concentration of coal-derived material in the mixture will typically be in the range 4 to 1.0 percent by mass and the concentration of the polyethylene oxide typically less than 1 percent by mass, typically 0.1 to 0.5 percent, by mass. Mixing is preferably carried out at a temperature of 40° to 55° C. and will generally be complete in 30 to 60 minutes. The spinning solution should be maintained at a temperature of between 40° and 55° C. to prevent premature gelling.

The polyethylene oxide can be dissolved directly in the coal-derived material solution. Care should be exercised to ensure there is no degradation of the polymer and that the solution is homogenous.

Referring now to the drawing, the spinning solution is placed in a container 10 and pumped through an orifice 12. The diameter of the orifice will typically be 0.2 to 0.3 mm. Multiple orifices can, of course, also be used. The spinning solution leaves the orifice 12 and thins to form a fiber which is drawn around roller 14. Between the orifice 12 and the roller 14 the fiber passes through a zone 16 where it is brought into contact with a gelling solvent and gelling of the fiber occurs. The fiber is pulled down through the gelling zone by the roller 14 and is thus under tension. This has the effect of reducing the diameter of the fiber. The diameter of the fiber may be controlled by the pumping rate through nozzle 12 and the speed of the roller 14.

The gelled fiber or green state which leaves the roller 14 is collected on roller 18. The gelled fiber preferably is allowed to sag between the rollers 14 and 18. Thus, the fiber is not under tension between these rollers. Drying of the gelled fiber takes place between the rollers 14 and 18. It has been found that by ensuring there is an absence of tension to the fiber between the rollers 14 and 18, stronger fibers result.

Collected on the roller 18 is the gelled and dried fiber which may be stabilized by oxidation in air. Stabilization is not always necessary and this is a very real advantage in minimizing process steps and increasing yield of fiber. The fiber is then carbonized at a temperature of 400° to 1100° C. in an inert atmosphere producing a carbon fiber which may be cut up into shorter lengths, if desired. The fiber diameter will vary according to the process parameters, but will typically be of micron size, e.g. 6 to 10 microns.

The carbonized fiber may be graphitized using methods known in the art to produce a fiber of higher fiber modulus. Typical graphitization conditions are 2000° C. to 3000° C., and preferably 2400° C. to 3000° C.

The invention will be further illustrated by the following examples.

EXAMPLE 1

A coal-derived material solution was produced by gently agitating a medium volatile coking coal (7 g) with dimethylformamide (DMF) (70 ml) in the presence of potassium hydroxide (1,1 g) at room temperature for 24 hours. The coal-derived material in solution had a carbon, hydrogen and oxygen composition essentially as set out for coal B in Table 1 above. The coal-derived material solution free of fine particles was mixed at 40° C. with an equal volume of polyethylene glycol (MW $4 \times 10^6$) solution (0.4%) in DMF. The combined solution (maintained at a temperature of 40° to 45° C. to prevent premature gelling) was pumped through a fine hole (0.3 mm) onto a roller where it came into contact with acetone gelling solution, to give a fiber of gel which was pulled by the roller at such a speed as to give a diameter of the fiber immediately prior to gelling of approximately 20 to 40 μm. The fiber was detached from the roller and allowed to dry before being collected on a second roller. Care was exercised in not allowing the fiber between the rollers to come under tension before being fired as otherwise little strength is developed. Pyrolysis at 800° C. in an inert atmosphere gave fibers of 7 to 15 micron diameter having a strength of 0.6 to 1.5 GPa.

EXAMPLE 2

A coal-derived material solution, 8 percent by mass of coal organic solids, was prepared by stirring 100 g of coal together with 1000 ml dry DMF and 10 g of finely divided sodium hydroxide at 90° C. for four hours, under an inert atmosphere. The composition of the coal-derived material in solution was essentially as set out for coal B in Table 1.

The slurry of coal-derived material solution and undissolved material was centrifuged, while still hot, at 2600 rpm for 30 minutes to remove the undissolved material. The last traces of fine particles down to submicron sizes were removed by filtration. The viscosity of the solution was approximately 3 cP at 30° C.

A solution of polyethylene oxide, average molecular weight of $4 \times 10^6$ daltons, was prepared by gently dissolving 0.1 g in 6 ml DMF at 45° C. This solution was added to 20 ml of the coal-derived material solution and the two gently stirred at 45° C. for 30 minutes. All operations were done under an inert atmosphere such as nitrogen. This produced a spinning solution.

The spinning solution was placed in a syringe pump held at 45° C. and pumped through an aperture of 0.3 mm into a bath of acetone, the fiber being pulled through at a speed of 0.5 m/sec by means of a roller. The time that the fiber was exposed to the solvent was from 0.2 to 0.6 seconds. The fiber was taken off the roller, allowed to dry completely in air over a distance of 5-6 m and collected on a take-up roller. Care was taken to ensure that the fiber was under essentially no tension at this stage of the operation.

The fibers on the take-up roller were removed and without the necessity of a stabilization step pyrolyzed in an inert atmosphere to 900° C. to give carbon fibers of 7-10 micron diameter having a tensile strength of 1,1 GPa.

EXAMPLE 3

A coal-derived material in solution having a composition essentially as set out for coal A in Table 1 and having 8 percent by mass of coal organic solids was prepared by stirring together 120 g of coal, 1000 ml DMF and 12 g sodium hydroxide.

After removal of solids, 20 ml of this solution was mixed together with 12 ml of a 1 percent polyethylene oxide (MW $4 \times 10^6$ daltons) solution in DMF. Fibers were prepared from this spinning solution, using the conditions set out in Example 2.

After heating the fibers for 30 minutes at 200° C. in air they were pyrolyzed at 900° C. to give fibers with a tensile strength of 1,0 GPa.

EXAMPLE 4

A coal-derived material solution as in Example 2, except having 12 percent by mass coal organic solids, was mixed with a polyethylene oxide solution as described in Example 2 to give a spinning solution having a concentration of 10 percent by mass coal-derived material and 0,4 percent by mass polyethylene oxide. Fibers were produced from the spinning solution using the conditions set out in Example 2. The fibers were pyrolyzed at a temperature of 900° C. in an inert atmosphere to give fibers with a tensile strength of 1,1 GPa.

We claim:

1. A method of producing carbon fiber comprising the steps of providing a solution of a coal-derived material in a solvent, the coal-derived material having a composition, free of solvent, of 70 to 91 percent by mass of carbon, 2 to 6 percent by mass of hydrogen, and 3 to 20 percent by mass of oxygen, adding polyethylene oxide having a molecular weight of at least $3 \times 10^6$ daltons to the solution to provide a spinning solution, spinning said spinning solution to form a fiber and allowing the fiber to gel.

2. A method according to claim 1 wherein the fiber is caused to gel by passing it through a gelling solvent.

3. A method according to claim 2 wherein the gelling solvent is selected from the group consisting of alcohols and acetone.

4. A method according to claim 1 wherein the fiber is caused to gel by evaporation of the solvent.

5. A method according to claim 2 wherein the fiber is caused to gel by contacting it with a gaseous gelling agent.

6. A method according to claim 5 wherein the gaseous gelling agent is a gaseous acid.

7. A method according to claim 1 wherein the gelled fiber is dried in the absence of tension being applied to the fiber.

8. A method according to claim 1 wherein the fiber is carbonized at a temperature in the range 400° to 1100° C. in an inert atmosphere.

9. A method according to claim 8 wherein the fiber is carbonized without the fiber having been stabilized.

10. A method according to claim 1 wherein the solvent for the coal-derived material solution is a dipolar, aprotic solvent.

11. A method according to claim 10 wherein the dipolar, aprotic solvent is selected from the group consisting of dimethylformamide, dimethylacetamide, tetramethylurea, dimethyltetrahydropyrimidinone and dimethylimidazolidinone.

12. A method according to claim 10 wherein the dipolar, aprotic solvent is dimethylformamide.

13. A method according to claim 1 wherein the viscosity of the coal-derived material solution is sufficiently low to allow it to be filtered to remove particles down to micron and sub-micron dimensions and the solution is filtered to remove such particles and larger particles.

14. A method according to claim 1 wherein the concentration of a coal-derived material in the solution is less than 25 percent by mass.

15. A method according to claim 1 wherein the concentration of coal-derived material in the solution is 4 to 12 percent by mass.

16. A method according to claim 1 wherein the polyethylene oxide has a molecular weight of at least $4 \times 10^6$ daltons.

17. A method according to claim 1 wherein the polyethylene oxide is added to the coal-derived material solution as a solution.

18. A method according to claim 17 wherein the solvent for the polyethylene oxide solution is a dipolar, aprotic solvent.

19. A method according to claim 18 wherein the dipolar, aprotic solvent is selected from the group consisting of dimethylformamide, dimethylacetamide, tetramethylurea, dimethyltetrahydropyrimidinone and dimethylimidazolidinone.

20. A method according to claim 18 wherein the solvent is dimethylformamide.

21. A method according to claim 17 wherein the solvent for the two solutions is the same.

22. A method according to claim 17 wherein the mixing of the polyethylene oxide solution and the coal-derived material solution takes place at a temperature below 60° C.

23. A method according to claim 22 wherein the temperature of the mixing is in the range 40° to 55° C.

* * * * *